Figure 1:
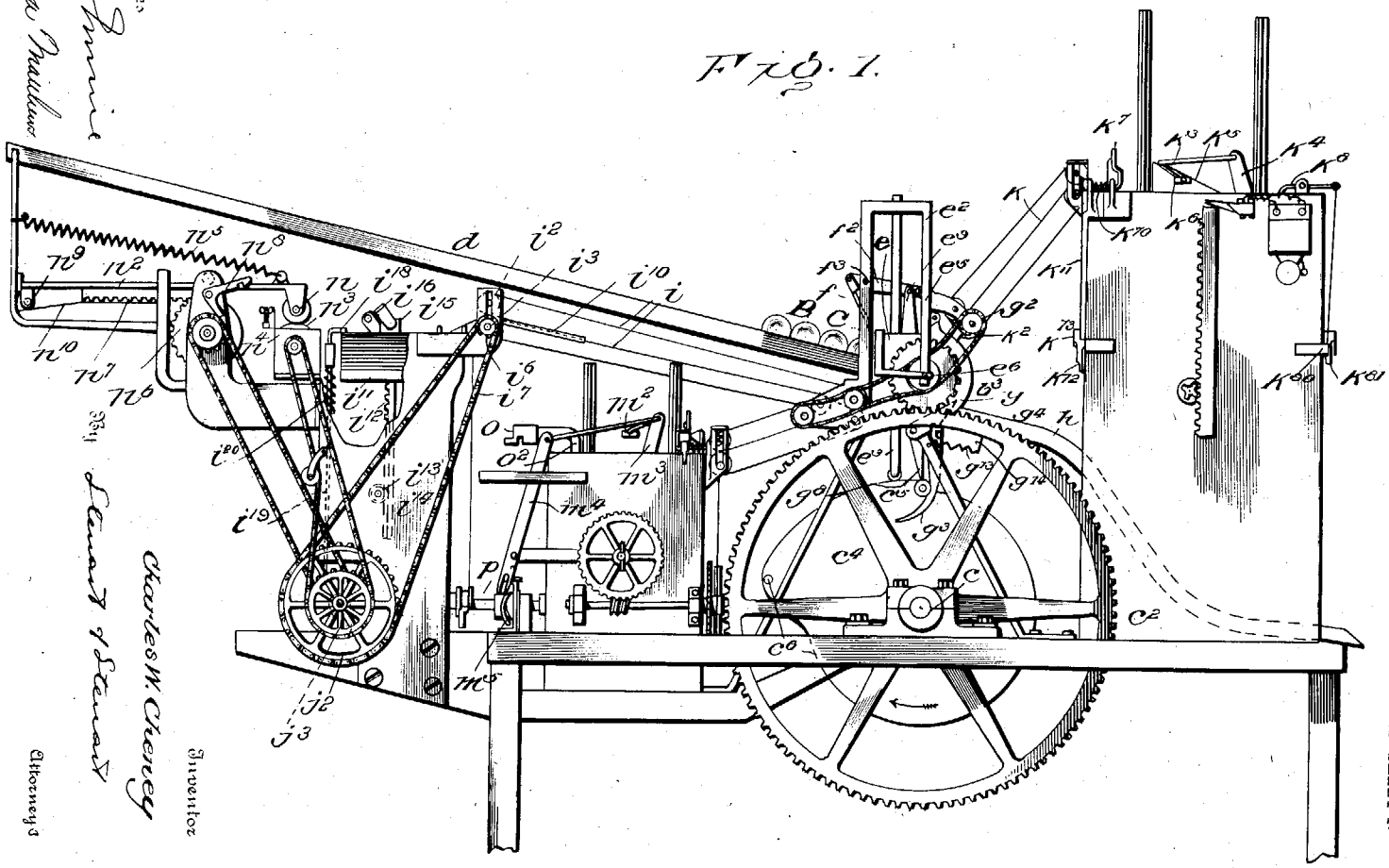

No. 12,197. REISSUED FEB. 23, 1904.

C. W. CHENEY.

MACHINE FOR APPLYING LABELS, WRAPPERS, &c.

APPLICATION FILED OCT. 20, 1903.

7 SHEETS—SHEET 1.

Witnesses

Inventor

Charles W. Cheney

By Stewart & Stewart

Attorneys

No. 12,197. REISSUED FEB. 23, 1904.

C. W. CHENEY.

MACHINE FOR APPLYING LABELS, WRAPPERS, &c.

APPLICATION FILED OCT. 20, 1903.

7 SHEETS—SHEET 2.

Witnesses

Jno. Minnie

Denza Matthews.

Inventor

Charles W. Cheney

By Stewart & Stewart

Attorneys

No. 12,197. REISSUED FEB. 23, 1904.

C. W. CHENEY.

MACHINE FOR APPLYING LABELS, WRAPPERS, &c.

APPLICATION FILED OCT. 20, 1903.

7 SHEETS—SHEET 3.

Witnesses

Denza Matthews

Inventor

Charles W. Cheney

Stewart & Stewart

Attorneys

No. 12,197. REISSUED FEB. 23, 1904.

C. W. CHENEY.

MACHINE FOR APPLYING LABELS, WRAPPERS, &c.

APPLICATION FILED OCT. 20, 1903.

7 SHEETS—SHEET 4.

Witnesses

Inventor

Louis Mathews.

By Charles W. Cheney

Stewart & Stewart

Attorneys

No. 12,197. REISSUED FEB. 23, 1904.

C. W. CHENEY.

MACHINE FOR APPLYING LABELS, WRAPPERS, &c.

APPLICATION FILED OCT. 20, 1903.

7 SHEETS—SHEET 5.

Witnesses

Jno. Minie

Denis Matthews

Inventor

Charles W. Cheney

By Stewart & Stewart

Attorneys

No. 12,197. REISSUED FEB. 23, 1904.
C. W. CHENEY.
MACHINE FOR APPLYING LABELS, WRAPPERS, &c.
APPLICATION FILED OCT. 20, 1903.
7 SHEETS—SHEET 6.
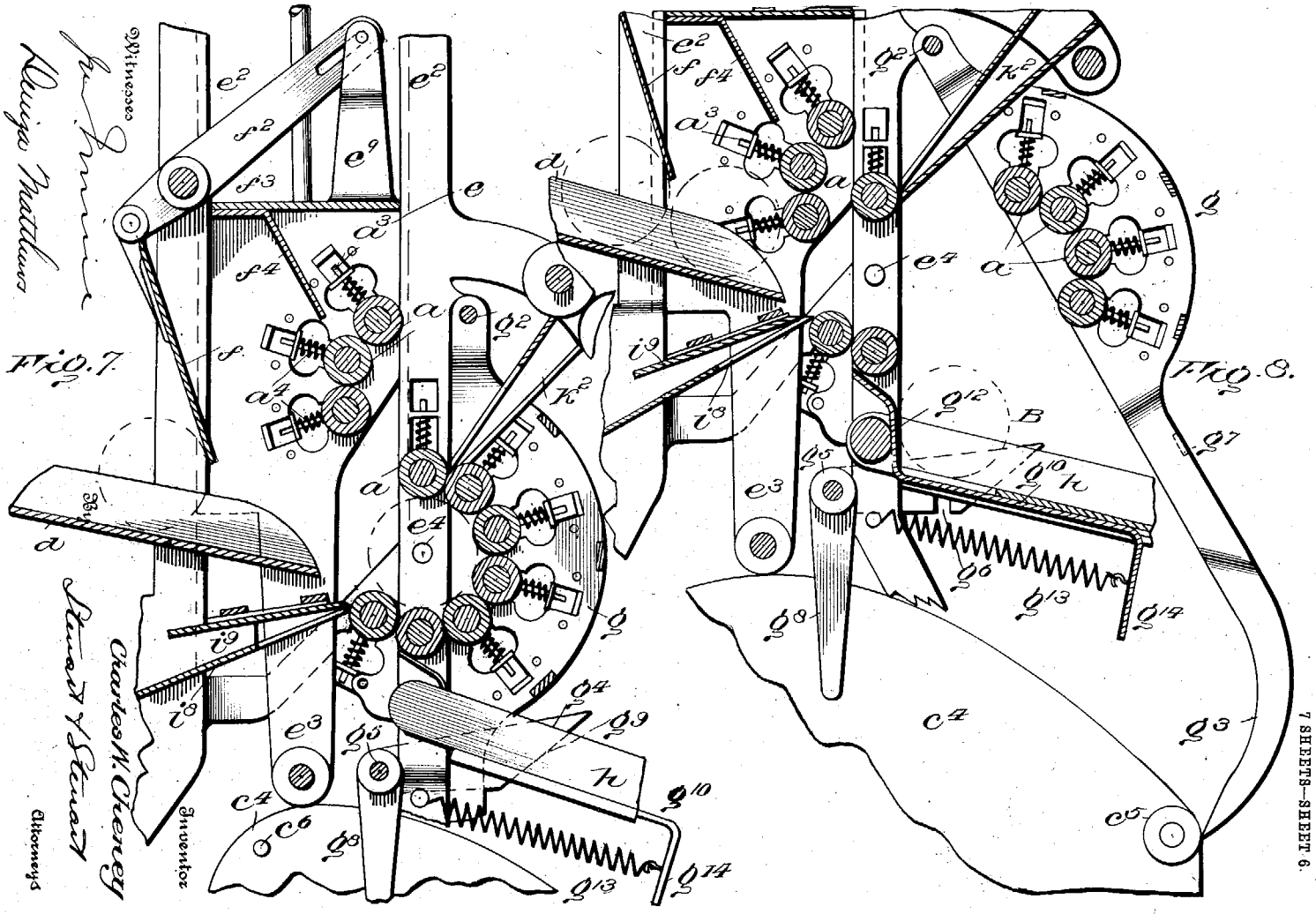
Witnesses
Louis Minie
Denise Matthews
Inventor
Charles W. Cheney
Stewart & Stewart
Attorneys No. 12,197. REISSUED FEB. 23, 1904.

C. W. CHENEY.

MACHINE FOR APPLYING LABELS, WRAPPERS, &c.

APPLICATION FILED OCT. 20, 1903.

7 SHEETS—SHEET 7.

Inventor
Charles W. Cheney

Witnesses
Louis Lemmine
Denza Matthews.

By Stewart & Stewart
Attorneys

No. 12,197. Reissued February 23, 1904.

UNITED STATES PATENT OFFICE.

CHARLES W. CHENEY, OF BROOKLINE, MASSACHUSETTS.

MACHINE FOR APPLYING LABELS, WRAPPERS, &c.

SPECIFICATION forming part of Reissued Letters Patent No. 12,197, dated February 23, 1904.

Original No. 713,853, dated November 18, 1902. Application for reissue filed October 20, 1903. Serial No. 177,814.

*To all whom it may concern:*

Be it known that I, CHARLES W. CHENEY, a citizen of the United States of America, and a resident of Brookline, county of Norfolk, State of Massachusetts, have invented certain new and useful Improvements in Machines for Applying Labels, Wrappers, &c., of which the following is a complete specification.

The present invention relates to a machine for automatically applying labels to bottles or packages, and is embodied in novel mechanism for applying the labels and for feeding the bottles or packages to the applying devices and delivering the said bottles therefrom.

As a further important feature of the invention the organization is such that circulars or wrappers, or both, can be wrapped around the bottles as well as the label applied, it being practicable to apply as many wrappers or analogous articles one over another to the bottle as may be desired.

The invention consists, broadly, in means for holding and revolving an article to be wrapped, wrapping a loose circular around the article and holding the same in position, and then wrapping a wrapper around the circular and securing the wrapper.

The invention also consists in first applying a label to the article to be wrapped while it is held, then wrapping a loose circular or the like around the article, holding the same in position, and then wrapping a wrapper around the circular, securing the ends of the wrapper, and thus holding the circular.

The invention also consists in the label-applying devices comprising a number of rolls so mounted as to surround the bottle, the rolls having bearings which are capable of yielding radially with relation to the bottle, but provided with a spring, so as normally to be pressed against the bottle, and the several rolls are arranged to be driven by gears or otherwise, the said gears or equivalent devices, however, being so arranged that a portion of the rolls can be moved from their normal position and restored to said normal position, properly coming into mesh with the driving-gear when thus restored.

To feed the bottles or packages to the applying-rolls, some of said rolls are mounted on a movable carrier, which is adapted at a certain period in the operation to be moved in such a manner as to open up a space through which the bottle drops, said bottle being arrested by other of the rolls, so that when the carrier returns to its normal position the rolls carried thereby will come into contact with the bottle and intermesh with the driving-gear in order to rotate the bottle, which is then surrounded by rolls substantially equally spaced, and press the label thereon. At the end of the labeling operation certain of the rolls are again moved out of the way, permitting the bottle to drop out, it being desirable that different rolls should be removable for this purpose in order that bottle may be fed and delivered by gravity, entering at one side of the roll system and passing out at the other side thereof, this, however, not being essential, though simple and effective.

The labels, which are picked up one by one by devices which will be hereinafter described, are delivered by suitable carriers, which lead toward the system of rolls, so that the label is inserted between two adjacent rolls, being caught between one of the said rolls and the rotating bottle, so that the several rolls and the bottle together carry the label around, smoothing and pressing the same against the surface of the bottle. By this organization it is obvious that any desired number of articles may be wrapped around the bottle, the label or whatever article is to lie next to the bottle being inserted first, the article which is to come next being inserted after the front edge of the label has traveled past, and so on, it being practicable, for example, to apply a label around which is wrapped a circular, the said circular being held in place by means of a wrapper, one edge of which may be pasted, so that the bottle leaves the machine with a label applied, a circular wrapped around the label, and a wrapper securely pasted around the circular to keep all the parts together. It is immaterial where the several articles are inserted so long as the feeding devices are timed to permit the front edge of the previously-inserted article to first pass by, so that the several feeding devices may be easily arranged without interfering with each other.

While for convenience the article which is operated upon has been described as a bottle, it is obvious that any other receptacle, such as a can, or, in fact, anything which is to be labeled or wrapped, may be operated upon by the machine.

The sheet-feeding devices, which are substantially the same for labels, circulars, and wrappers, are shown as comprising retaining devices for the top sheet, combined with releasing means adapted to operate at the proper time, and a pushing or forwarding device, which is arranged to engage the surface of the top sheet and move the same longitudinally and free it from the sheets below and carry it into contact with the feeding-aprons or analogous devices.

In connection with the labels and wrappers a paste-applying device is also used and arranged to apply paste in the proper position on the sheet just before the feeding device operates, the adhesive quality of the paste being depended upon in this case for the engagement of the sheet by the forwarding member or finger. In the case of thin sheets, such as labels or wrappers, two retaining devices are employed, one for the end of the sheet which is farthest away from the feeding-aprons and one for the end which is adjacent to said feeding-aprons, the former being released as soon as the sheet is engaged by the forwarding member, the latter not being released until slightly later in the period of operations, so that as the forwarding device moves forward it practically humps up the middle of the sheet, tending to separate the same from the sheet below, the front portion of the said sheet when released jumping forward, so to speak, owing to the tendency of the sheet to straighten itself. Since the circulars are not pasted, the forwarding member must be provided with engaging means, it being practicable to employ a block having a short needle-point, which catches the top sheet of the circular and moves the same along.

The invention is shown as embodied in a machine especially adapted for labeling and wrapping bottles, each of which bottles is supplied with a label, a somewhat bulky circular, and a wrapper inclosing said circular, and certain of the appliances used are especially adapted for this particular purpose, it being understood, however, that the novel features of the invention are of such a nature that they may be used to advantage in various connections and that the invention is not limited to the specific construction and arrangement which has been selected as an illustration.

In the machine shown paste-applying devices of novel construction and arrangement are used, the paste-applying device for the label differing in its specific construction from that of the wrapper, since the label requires a layer of paste extending substantially wholly across its surface, while the wrapper only requires a line of paste along its overlapping edge.

As herein shown, the paste-applying device for the label comprises a paste-applying roll carried by a longitudinally-movable frame, the said roll normally standing in contact with a continuously-rotating roll, the body of which is immersed in the paste or adhesive material, so that the said paste-supplying roll becomes covered with paste between successive operations. At the proper time after the said roll has been covered with paste the frame which carries the same is moved longitudinally and the roll guided into contact with the surface of the upper label, rolling along the whole length of the same and applying paste thereto. This happens prior to the movement of the forwarding member, which then comes in contact with the pasted label adhering thereto, so as to separate and forward the same, as described. The paste-applying device for the wrappers comprises a paster mounted on an arm which extends radially from a rotatable member, so that in the rotation of the said member the paster crosses a suitable paste-roll and then crosses the end of the wrapper, the rotatable member being arranged to move vertically downward just as the paster crosses the wrapper, so that it descends into contact therewith and leaves a line of paste across the edge thereof.

Figure 2:
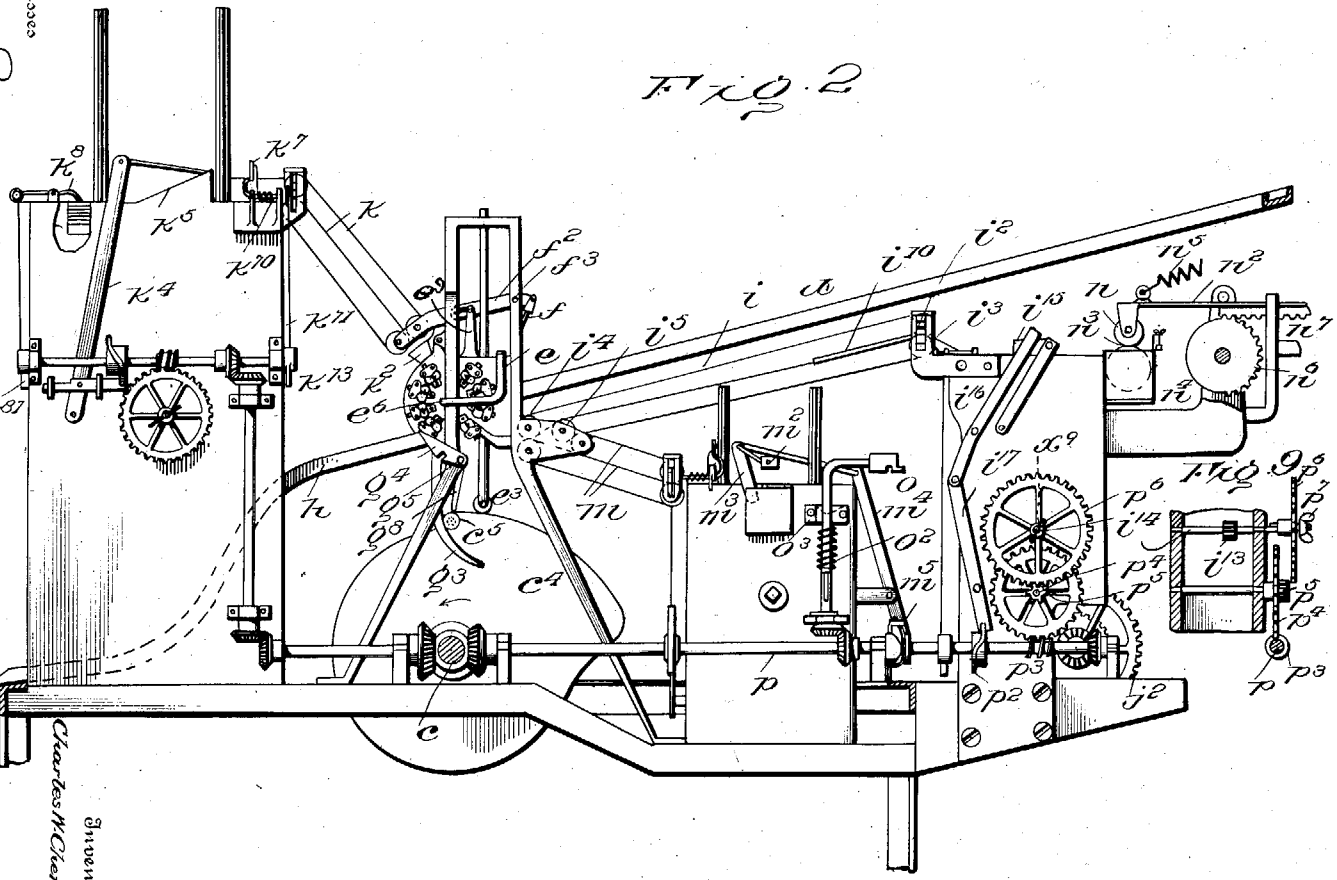
Figure 3:
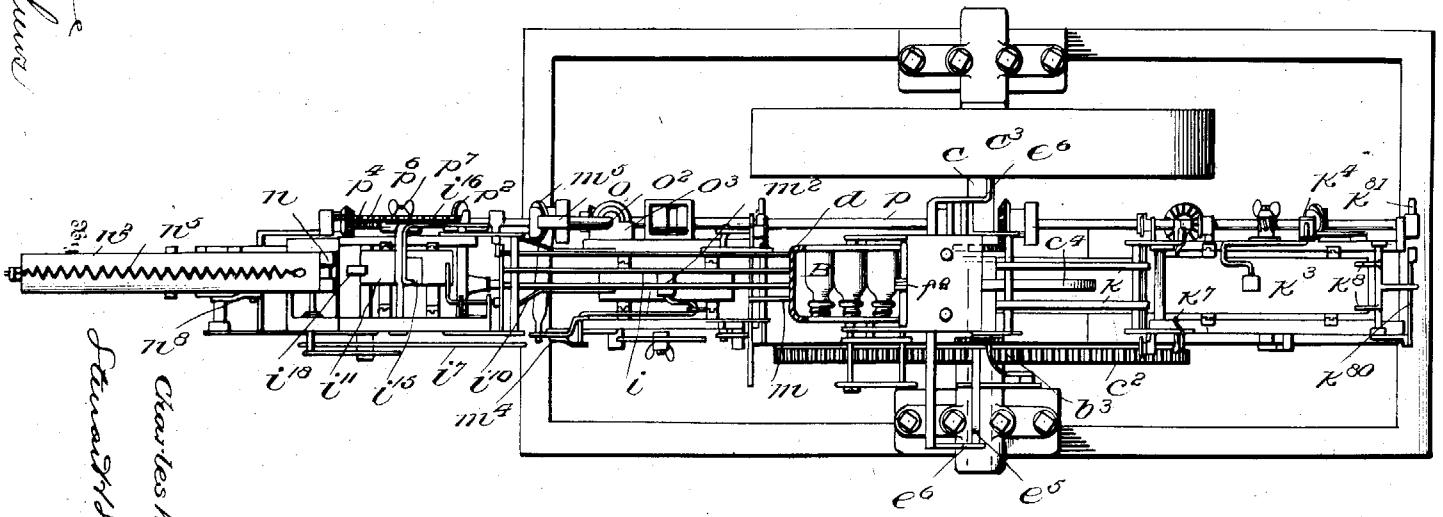
Figure 4:
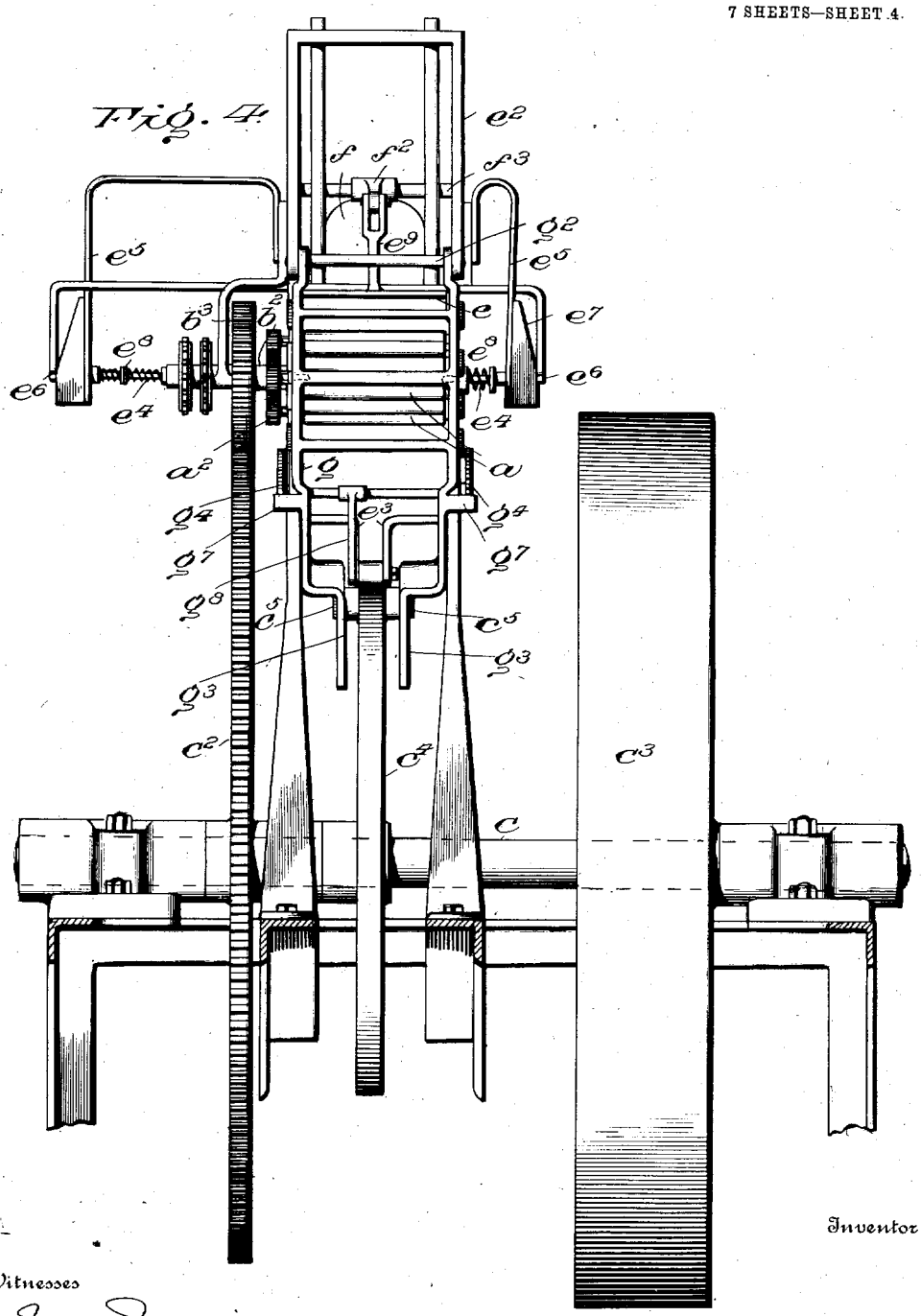
Figure 6:
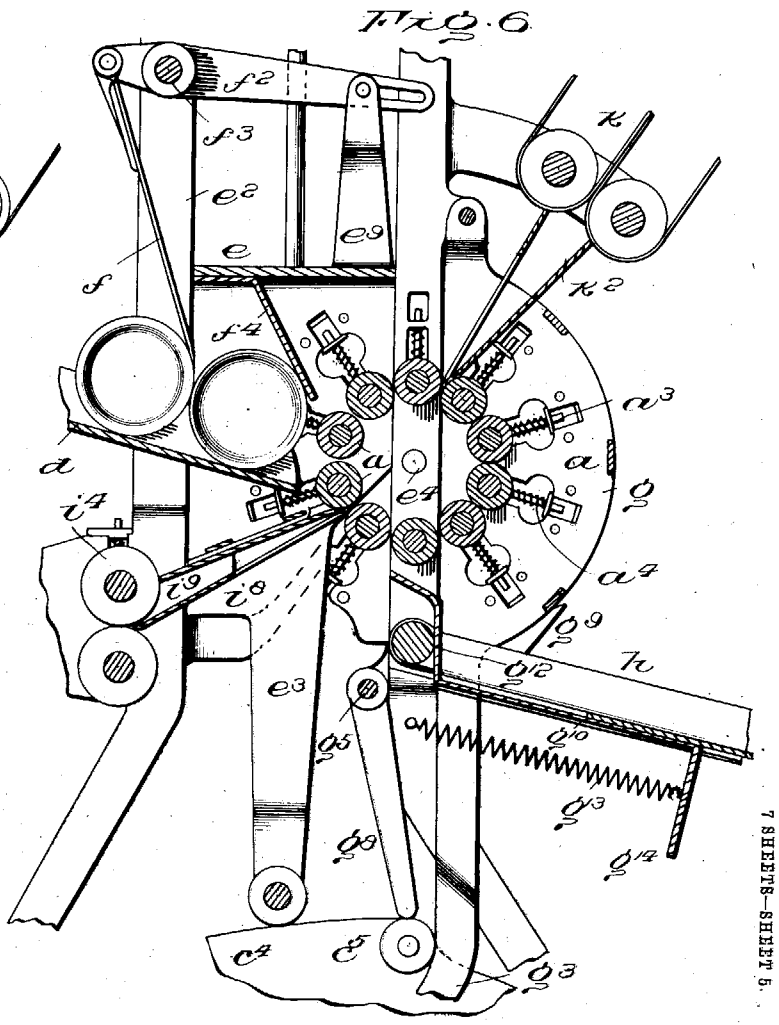
Figure 5:
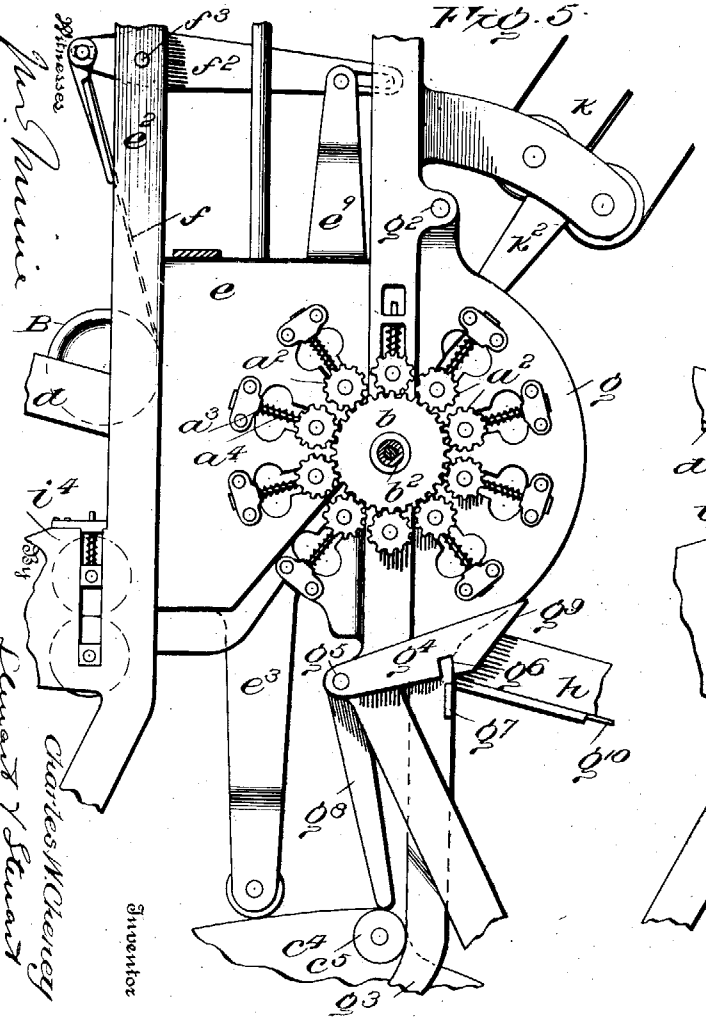
Figure 10:
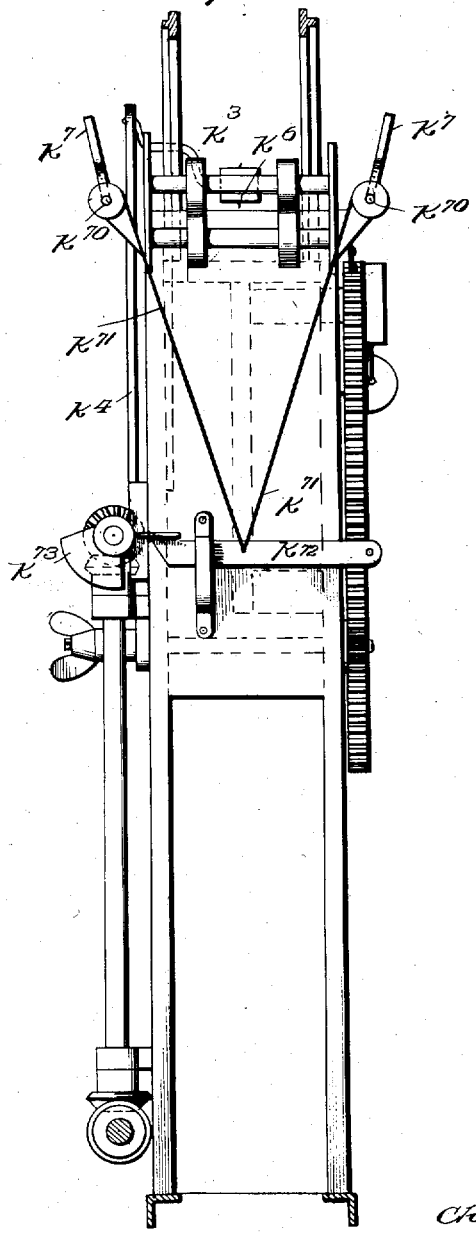

Figure 1 is a general side elevation of a machine embodying the invention. Fig. 2 is a similar side elevation looking at the opposite side of the machine. Fig. 3 is a plan view. Fig. 4 is an enlarged transverse sectional elevation. Fig. 5 is an enlarged side elevation of the label-applying devices alone. Fig. 6 is a longitudinal section through the label-applying rolls on the same scale as Fig. 5. Fig. 7 is a section similar to Fig. 6, showing part of the rolls removed for the insertion of a bottle. Fig. 8 is a similar view showing part of the rolls removed for the discharge of a bottle. Fig. 9 is a detail view taken on line $x^9$ of Fig. 2; and Fig. 10 is an enlarged transverse section taken through the frame near the right-hand end of Fig. 1, showing the mechanism for feeding the circulars mainly in elevation.

The label-applying devices consist of a cage or series of rolls $a$ so arranged as to surround the article to be labeled and substantially equally spaced, each roll being provided with a gear $a^2$, adapted to mesh with a gear $b$, common to all the rolls, and mounted on a shaft $b^2$, having another gear $b^3$, which is adapted to mesh with a gear $c^2$ on a shaft $c$, which is suitably driven in the operation of the machine, the said shaft being herein shown as the main driving-shaft and provided with a pulley $c^3$. Each of the rolls $a$ (except the lowermost roll) is mounted in bearings having stems or supports $a^3$, which are longitudinally movable in a direction radial of the space which is to contain the bottle, the said stems being provided with springs $a^4$, whereby the rolls are yieldingly pressed toward the said bottle, the lowermost roll, however, having rigid bearings in the frame, so as to properly position and support the bottle.

The gear-teeth on the gears $a^2$ and $b$ are of sufficient depth to remain in mesh, while the bearings for the rolls $a$ yield in response to variations in the sizes of the bottles or the thickness of the articles being applied thereto.

The bottles B are fed to the label-applying devices or rolls along the chute $d$, which is preferably inclined, so that the bottles will roll down by force of gravity, and in order to permit the bottles to enter the space between the rolls part of said rolls are mounted in a movable frame or support E, which is herein shown as vertically movable in guides $e^2$ and provided with a downwardly-projecting member $e^3$, which is arranged to be acted upon by a cam $c^4$ on the shaft $c$, so that at a certain period in the operation the said movable support and the rolls carried thereby are moved upward, leaving a space of sufficient size to permit the bottle to drop in, the said bottle then being held in position by the remaining rolls until the support $e$ is restored to its normal position. (See Fig. 7.)

To keep the bottle from moving endwise while the label is being applied, (which would result in an improper application of the label,) a centering device is employed and is shown as consisting of a pair of longitudinally-movable rods $e^4$, the ends of which are adapted, respectively, to engage the ends of the bottles, the said rods being normally separated from each other a distance greater than the length of the bottle of maximum size, so as not to interfere with the insertion or removal of a bottle. As herein shown, the said rods are mounted on spring-supports $e^5$, but are moved toward each other by suitable mechanism after the bottle has dropped into place, it being practicable to employ arms or engaging portions $e^6$, connected with the carrier $e$ and adapted to act on inclined surfaces $e^7$, connected with the spring-supports $e^5$. As the carrier moves up, therefore, to open the space for the insertion of a new bottle the rods $e^4$ move apart, but are brought together to engage the bottle as the carrier $e$ moves down. To compensate for irregularities in the lengths of the bottles, each rod is longitudinally movable with relation to its support, being held, however, in a certain predetermined position by means of a spring $e^8$, so that the said rods will engage and position any bottle without being positively forced against the ends thereof, which would create undue frictional resistance to the rotation of the bottle.

In order to prevent more than one bottle from entering when the support $e$ is moved out of the way, the machine is provided with a separator $f$, shown as a flat piece of sheet metal pivotally connected to the end of the lever $f^2$, which is pivoted at $f^3$ in the guide for the support $e$, the opposite end of the said lever being connected with said support, which is shown as provided with an upwardly-projecting member $e^9$ for the purpose. As the support $e$ moves upward, therefore, the the separator $f$ moves downward behind the bottle which is to be operated upon and in front of the next bottle in the line, so that only one bottle at a time can enter. To keep the lowermost bottle out of contact with the rollers or roller-frame during the labeling operation, said roller-frame is provided with a supplemental separator $f^4$, which moves down as the separator $f$ moves up, the bottle released by the former being stopped and held by the latter, as shown in Fig. 6.

The gear $b$ is arranged to rotate continuously, and as soon as the support $e$ drops back to its normal position the rolls carried thereby will begin to rotate, the several rolls which are then in rolling contact with the bottle causing the bottle to rotate, so that if the end of the label or wrapper is inserted between one of said rolls and the bottle it will be carried around the bottle and pressed against the same, each roll contributing in the operation.

When the operation of labeling, wrapping, &c., is finished, the bottle is delivered by the removal of certain of the rolls, a set of rolls other than those which were removed to feed the bottle being preferably employed, so that the bottle can enter from one side and pass out from the other side by force of gravity.

As herein shown, certain of the rolls are mounted on a swinging frame $g$, which is pivoted at $g^2$ and provided with tails or projections $g^3$, which are arranged to be engaged by projections $c^5$, which are shown as carried by the cam $c^4$. At the proper period in the operation, therefore, the said tails $g^3$ will be engaged by said projections, which will swing the frame $g$ outward, as best shown in Fig. 8, removing certain of the rolls from the bottle and permitting the same to drop out into a suitable delivery-chute $h$. To retain the member $g$ in its closed position while the bottle is being operated upon, the said member is shown as provided with a locking device $g^4$, shown as latches pivotally supported at $g^5$ and having retaining-notches $g^6$ to engage projections $g^7$, the said latches having a tail $g^8$, which normally stands just ahead of the tails $g^3$ and in the path of one of the projections $c^5$. In the rotation of the shaft $c$, therefore, the locking device will be lifted just before the tails $g^3$ are engaged, so that the member $g$ is free to swing outward in response to the rotation of the shaft.

The latches $g^4$ are provided with inclined latching-surfaces $g^9$, so that when the member $g$ falls back into position after the projections $c^5$ have passed out of engagement with the tails $g^3$ they will automatically lock.

The parts above described constitute what may be termed a "separable cage of rollers," in which the several rollers are substantially equally spaced, so as completely to surround the article to be labeled, the movable portions of the cage each containing a sufficient number of rollers to permit the insertion or removal of the article when the said movable portions are separated from the rest of the cage.

Owing to the rotation of the rolls, the bottle is inclined to cling to the said rolls and not drop out readily even when the swinging frame $g$ is moved out of the way. Furthermore, it is essential that the bottles should be released from the centering device above described when delivered.

In order to release the centering device and then positively eject the bottle, the carrier $e$ is arranged to be started upward before the frame $g$ is closed or restored to normal position, and in such upward movement the lowermost roll upon the carrier will press against the side of the bottle, since the said roll is below the axis of the bottle, the consequence being that the upward movement of the carrier $e$ not only releases the centering device, as above described, but also causes the bottle to be actually pushed forward. The frame or member $g$ falls back and is locked in position, however, just before the next bottle drops in, so as to prevent the same from falling through. As the support or carrier $e$ moves down the lowermost roll thereon will yield in passing the axis of the bottle, owing to the yielding bearing in which it is supported.

To prevent obstructing the passage-way of the bottle into the delivery-chute by the presence of a previously-delivered bottle, which might be caught therein, the said chute is provided with what may be termed a "kicker-off," which is herein shown as a movable member $g^{10}$, having an engaging portion $g^{12}$, which stands just behind the bottle in the chute, the said member being held in normal position by means of a spring $g^3$ and adapted to be moved forward against the stress of the said spring by means of a projection $c^6$ on the main cam $c^4$, which engages a projection $g^{14}$, connected with the member $g^{10}$.

After the bottle is placed in position within the system of rollers it is necessary only to insert the end of a label or wrapper into the space between two of the said rolls until the end thereof is caught between the periphery of the bottle and carried around the bottle in the rotation thereof. Furthermore, it is obvious that any number of articles may be wrapped around the bottle one over another by merely feeding one article after another, the feed preferably taking place at different points, so that all of the articles can be fed at nearly the same time and rolled into position at substantially one operation. As herein shown, feed-aprons are employed, which consist of belts traveling over rollers, two belts lying in contact with each other and traveling in the same direction, so as to nip the article between them and carry the same along. The labels, for example, are fed by means of the aprons $i$, which pass over rolls $i^2$ $i^3$ $i^4$ $i^5$, one of which is provided with a sprocket $i^6$, adapted to be rotated by a chain $i^7$, passing over a suitable sprocket $j^2$ on the shaft $j$. Adjacent to the roll $i^4$ is a guide $i^8$, provided with an inclined upper portion $i^9$, the said guide and upper portion terminating between two of the rolls $a$, so that the label when moved forward by the apron will travel up the said guide until its end reaches the roll and is inserted between the same and the periphery of the bottle.

The apron for the label is preferably in the form of three narrow strips or ribbons, there being a coöperating strap traveling with the middle strap only, and the paste is applied along two or more narrow lines at the sides of said middle strap, so that the apron may engage that portion of the label where there is no paste, the two outer straps merely supporting the edge of the label, but not contributing in the conveying thereof. This construction is shown in Fig. 3, the single upper strap being indicated as passing over the pulley which carries it, while the two outer straps, which lie below the said upper strap, are shown as passing under the pulley-shaft.

The label-feeding device is shown as at some distance from the applying-rolls and to insure the proper presentation of each label may be provided with guides $i^{10}$, adjacent to the outer supporting-ribbon and adapted to engage the edges of the label in case said label does not lie straight. If, for example, when the label is picked up one corner thereof is nipped by the rolls instead of the entire edge, the label will lie diagonally instead of straight; but as soon as it passes out from the rolls it will be readily straightened by the guides, the frictional resistance of the carrying-ribbon being very slight.

The circulars are shown as fed by means of the apron $k$, which is adapted to carry the circular into a guide $k^2$, which guides the same in between the rolls and the bottle, the circular feed being so timed that the circular will not enter until the front edge of the label has passed the point where the circular enters, the circular thus overlying the label.

The wrapper may be applied through the same guide $i^8$ $i^9$ which is employed for the label, it being obvious that if the said wrapper is fed just after the circular has gone in it will overlie both the label and the circular, thus forming the outside covering. The wrappers are fed by means of the apron $m$ and a suitable system of rollers, the wrapper-feeding device being so timed that the wrapper will be supplied just after the label.

In order to produce a substantially automatic operation throughout, the machine is provided with sheet feeding or separating devices adapted to feed the top sheet from the pile to the feed-apron at the proper time in the operation of the machine.

The labels are herein shown as contained on a support $i^{11}$, provided with a rack $i^{12}$, adapted to be operated by a pinion $i^{13}$ on a shaft $i^{14}$, which is suitably geared to a counter-shaft $p$, through a worm $p^3$, gears $p^4$ and $p^5$, and a gear $p^6$ on shaft $i^{14}$, the rotation of said pinion $i^{13}$ thus being sufficient to raise the support $i^{11}$ a distance substantially equal to the thickness of one label after each label has been fed, so that the top label will always lie in the same horizontal plane. The gear $p^6$ is connected with the shaft $i^{14}$ by a feather or spline and is held in position by a thumb-screw $p^7$, so that by loosening said thumb-screw the gears can be thrown out of mesh to lower the support when a new supply of labels is needed. The top label is arranged to be engaged at a point near the rear edge thereof by a swinging member $i^{15}$, shown as operated by a lever $i^{16}$, which in turn is connected with a lever $i^{17}$, arranged to be operated by a cam $p^2$ on the counter-shaft $p$, the arrangement being such that the said member $i^{15}$ will travel first downward into contact with the top of the label and then upward, so as to pick up the said label, having also a forward movement, so as to push it along toward the feed-apron. To cause the member $i^{15}$ to lie flat on the label, the said member is shown as pivotally connected with the lever $i^{16}$ and also connected with a link which is pivotally secured to the frame.

The labels are provided with a retaining device $i^{18}$, shown as mounted on a vertical rod $i^{19}$ and held down by means of a spring $i^{20}$, the said rod being arranged to be lifted at the proper period by means of a cam $j^3$ on the shaft $j$, so that the top label is pushed forward until the front edge thereof is caught by the feed-apron $i$. Previously to the feeding operation the label is supplied with paste by means of a paste-supplying device $n$, which is shown as a roll mounted on a slide $n^2$, the said roll normally standing, as shown, in contact with a roll $n^3$, contained in a paste-reservoir $n^4$ and adapted to be continuously rotated, as by a suitable chain and sprocket. The roll $n^3$ being immersed in the paste will carry up a layer of paste, which is rolled onto the surface of the roll $n$, the said roll $n$ being then moved forward and guided into contact with the surface of the top label, traveling the length of the same and leaving a line or lines of paste along the surface thereof.

As shown, the slide or carrier $n^2$ is held in its normal position by means of a spring $n^5$ and is arranged to be moved forward by means of a mutilated gear $n^6$, which meshes with rack-teeth $n^7$, so that during a half-rotation of said gear the roll $n$ is carried forward, while during the other half of the rotation the spring $n^5$ acts to restore the said roll, the rack then being out of the mesh with the gear.

The member $n^2$ is preferably locked in normal position by means of an automatic locking device or latch $n^8$, which is arranged to be tripped by a projection secured to the shaft, which carries the gear $n^6$, just before the teeth of the said gear come into mesh with the teeth $n^7$. At the end of the carrier $n^2$ is a roll $n^9$, adapted to ride up an inclined surface $n^{10}$, which thus acts to tip the front of the carrier downward toward the label, and force the roll $n$ into contact therewith. In the case of the labels the adhesiveness of the paste is utilized to cause the said label to be engaged by the feed member $i^{15}$, which picks up the label simply because the same will adhere thereto. As soon, however, as the label is engaged by the feed-apron it will be pulled away from the said member and fed along, as described.

The circulars are supported upon a support or carrier, which is provided with a rack and pinion substantially like that described in the label-support, and the feed is accomplished in substantially the same way, there being a feed member $k^3$, carried by a lever $k^4$, and guided in its movement by means of an inclined guide-surface $k^5$. Since, however, the circulars are not pasted, the member $k^3$ is provided with a pin-point $k^6$, which catches the surface of the circular and causes the same to be carried along and is preferably pivoted to its carrying-lever, as shown in Fig. 1, so as always to lie flat on the surface of the circular. The circulars are shown as provided with suitable retaining devices $k^7$ and $k^8$ at the front and back, the one at the back being released just prior to the release of the one at the front, so that the circular is humped up in the middle and will tend to straighten out and move toward the feeding-apron $k$ when the front is released.

The retaining device $k^8$ is in the form of a pivoted lever, one end of which is connected with a lever $k^{80}$, adapted to be actuated by means of a cam $k^{81}$, to lift the said retaining device at the proper time, the said retaining device being normally held down by means of a spring. The retaining device $k^7$ for the front of the label is shown as comprising a pair of fingers, each mounted on a rocker member $k^{70}$, having a spring adapted to hold the fingers normally out of engagement with the circular, the said rockers, however, being connected, by means of flexible members $k^{71}$, with a lever $k^{72}$, which is arranged to be operated by means of a cam $k^{73}$ to force the said fingers into engagement with the said circular, the said fingers being suddenly released when the cam passes by.

The rack which carries the support for the circulars is shown as adapted when in its uppermost position to engage one of a pair of electrical contact and to move the same into engagement with its mate, thereby completing an electric circuit containing a bell. This gives an audible alarm when the supply of circulars is exhausted.

The wrapper-feed is substantially the same as that already described in connection with circulars and labels, the forwarding member $m^2$ being guided in its movement by a link $m^3$, which is substantially the equivalent for the guide-surface $k^5$, above described, and operated by means of a lever $m^4$ and cam $m^5$.

The retaining device which is employed for the front of the label and wrapper is substantially the same in construction and operation as the retaining device $k^7$ and need not, therefore, be further described. The specific construction and arrangement of the pasting device, however, are different from that employed with the labels, it being desirable in the case of wrappers to apply only a thin line of paste along the overlapping edge of the wrapper. To apply the paste in this way, a paste-applying member $o$ is shown as mounted on a rotatable shaft $o^2$, driven by a beveled gear on the counter-shaft $p$, a portion of said shaft $o^2$ being splined or similarly connected with the other portion, so as to have a longitudinal as well as a rotary movement.

The paste-applying device $o$ is connected to the longitudinally-movable portion of the shaft $o^2$, which is shown as bearing in a cup $o^3$, having a cam-surface, so that as the said paste-applier $o$ passes over the end of the wrapper it will dip briefly and come into contact therewith, leaving a daub of paste as it travels across.

The forwarding member $m^2$ adheres to the paste, as is the case with the label-forwarding device, the feed being, therefore, substantially the same in the case of the wrapper as in the case of the label.

I claim—

1. In a labeling-machine, a series of label-applying devices substantially equally spaced and adapted to completely surround the article to be labeled; a separable frame or cage for said devices, each member of which contains two or more of said devices; means for automatically moving part of the said frame and the applying devices carried thereby to afford space for the insertion or the removal of the article; means for presenting the article to the frame in line with the space thus afforded; and connecting mechanism for operating said label-applying devices and said automatic means.

2. In a labeling-machine, a series of label-applying rolls substantially equally spaced and adapted to surround and engage the article to be labeled; rotating means common to all of said rolls; a separable cage or frame, each member of which contains bearings for a plurality of said rolls; means for automatically moving one of the separable members of the said frame out of the way for the insertion or removal of the article; means for presenting the article to the frame in line with the space thus afforded; and connecting mechanism for operating said rotating means and said automatic means.

3. In a labeling-machine, a series of label-applying rolls substantially equally spaced and arranged to surround the article to be labeled; bearings for said rolls spring-pressed toward the said article; rotating means common to all of said rolls; a separable frame containing said bearings; and means for automatically removing part of said frame for the insertion or removal of the article, substantially as described.

4. In a labeling-machine, a series of rolls adapted to surround the article to be labeled, each roll being provided with a gear; a single gear intermeshing with the gears of all of said rolls, a movable frame containing the bearings for a plurality of said rolls; means for automatically moving the said frame to afford space for the insertion or removal of the article; means for presenting the article to the frame in line with the space thus afforded; and connecting mechanism to operate said gear and said automatic moving means.

5. In a labeling-machine, a feed-chute for the articles to be labeled; a series of rolls close together and equally spaced and arranged to surround and bear against the said article; a movable frame for a plurality of the rolls which are in line with the chute; means for automatically moving the said frame to afford space for the insertion of the article; and connecting mechanism to operate said rolls and the means for moving the said frame.

6. In a labeling-machine, a series of label-applying rollers equally spaced and close together; a feed-chute leading toward said rollers; means for automatically moving a plurality of the rollers out of the path of said feed-chute for the insertion of the article; a delivery-chute at the opposite side of the series of rollers; and a removable frame for a plurality of the rollers which are above said delivery-chute, substantially as described.

7. The combination with a series of label-applying rollers arranged close together; of a frame movable in a straight line and containing the bearings for a plurality of the said rollers, a swinging frame containing bearings for others of the said rollers; and means for consecutively moving the said frames to permit the article to enter from one side and be delivered from the other side, as set forth.

8. The combination with the label-applying rollers; of a swinging frame containing the bearings for a plurality of the said rollers; a locking device for said swinging frame; and means for unlocking said locking device and then swinging the said frame after the labeling operation has been completed, as set forth.

9. In a labeling-machine; the combination with means for revolving an article to be wrapped; of means for delivering a loose circular or the like about the article and holding the circular wrapped on the article; and means for thereafter delivering a wrapper and wraping the same around the article to be wrapped, whereby the loose circular will be held inside the wrapper.

10. In a labeling-machine; the combination with means for revolving an article to be wrapped; of means for applying a lable to the article; means for delivering a loose circular or the like and wrapping the same about the article and holding the same wrapped on the article; means for thereafter delivering a wrapper and wrapping the same around the article to be wrapped; whereby the loose circular will be secured to the article and inside the wrapper.

11. The combination with a series of label-applying rollers adapted to surround the article to be labeled; of a plurality of delivering devices adapted to deliver labels, circulars or the like between adjacent rolls; and means for relatively timing said feeding devices to feed one article over another consecutively.

12. In a labeling-machine, a cage or frame of rollers; a stationary rigid bearing for one or more rollers in said frame; the rigidly-supported roller or rollers positioning the article to be labeled; and spring-supported bearings for the remaining rollers, as set forth.

13. The combination with means for applying labels or wrappers; of a paste-applying device adapted to apply paste to the top sheet of a pile; a feed-finger and means for moving said feed-finger rearward and downward into contact with the pasted sheet, and then upward and forward to separate and advance the sheet adhering thereto; and a feed-apron to receive the sheet thus advanced, as set forth.

14. The combination with means for applying labels or wrappers; of a paste-applying device comprising a movable paste-roll; a paste-reservoir; a reciprocating member to carry said roll, said member being provided with rack-teeth; a spring connected with said member; a mutilated gear coöperating with said rack member; and a guide for the said member to move the roll carried by said member downward into contact with the top sheet of the pile, as set forth.

15. The combination with the label-applying device; of a feed-apron having upper and lower members to forward the labels; and guides arranged adjacent to said feed-apron at opposite sides thereof to coöperate with the pasted edges of the label and straighten the said label before it reaches the applying devices.

16. In a machine for applying labels and the like; a series of rolls substantially equally spaced and arranged to surround completely the article to be labeled; a gear common to all of said rolls for rotating the same; a rigid bearing for one of said rolls, the roll having the rigid bearing constituting the means for positioning the article; and yielding bearings for the other rolls, as set forth.

17. The combination with a number of label-applying rolls having their peripheries close together and arranged to surround the article to be labeled and engage the surface thereof at points substantially equally spaced; of a centering device to engage the ends of the article and position the same endwise; and means for operating the said centering device after the article has been fed to the label-applying rolls.

18. The combination with a number of label-applying rolls arranged to surround the article to be labeled; of means for moving a plurality of the rolls out of the way to permit the insertion of the article; a centering device to engage the ends of the article to position the same endwise; and means for operating said centering device to engage the article after it has been inserted and release the same prior to its delivery, as set forth.

19. The combination with a number of label-applying rolls arranged in a circle to surround the article to be labeled; of a frame containing yielding bearings for a plurality of said rollers; means for moving said frame in a substantially straight line to carry the rollers out of the way for the insertion of the article; a second frame for others of the rollers adapted to be moved out of the way to permit the delivery of the labeled article; and means for moving the first frame before the second frame is restored.

20. The combination with a separable cage of label-applying rollers substantially equally spaced and adapted to completely surround the article to be labeled; of a movable frame carrying a plurality of said rollers; means for automatically moving said frame to afford space for the insertion of the articles to be labeled; a chute for the articles to be labeled inclined toward said frame; a separator; means for moving said separator into engagement with the last article but one in the chute when said frame is moved away from the cage; and connecting mechanism for operating said rollers, said means for moving said frame and the means for moving the separator, as set forth.

21. The combination with a cage of label-applying rollers lying close together and adapted to surround the article to be labeled; of a movable frame carrying a plurality of said rollers; a chute for the articles to be labeled, inclined toward said frame; a separator; means for moving said separator into engagement with the last article but one in the chute when said frame is moved away from the cage; a retaining member connected with the cage to be moved thereby into engagement with the last article in the chute when said frame is restored, as set forth.

22. The combination with a cage of label-applying rollers adapted to surround the article to be labeled; of a movable frame carrying part of said rollers; a centering device comprising longitudinally-movable rods to engage the ends of the articles; springs or the equivalent for normally holding said rods out of engagement with the articles, and engaging members connected with the frame and cooperating with said rods to force them into engagement with the article to be labeled.

23. The combination with a cage of label-applying rolls substantially equally spaced and arranged to surround the article to be labeled; of yieldingly-supported bearings for part of said rolls; means for removing a plurality of the rolls to permit the egress of the article from the cage; and means for dislodging the article from the cage after said rolls have been removed.

Signed by me at Boston, Massachusetts, this 4th day of September, 1903.

CHAS. W. CHENEY.

Witnesses:

FRANK M. WEYMOUTH,
JOHN P. REARDON.